Patented Nov. 20, 1945

2,389,250

UNITED STATES PATENT OFFICE 2,389,250

ISOMERIZATION

Alfred W. Francis, Woodbury, N. J., and William H. James, State College, Pa., assignors to Socony-Vacuum Oil Company, Incorporated, New York, N. Y., a corporation of New York No Drawing. Application October 1, 1941,
Serial No. 413,156

17 Claims. (Cl. 260—683.5)

This invention relates to processes for converting hydrocarbons to isomers thereof and is particularly concerned with the conversion of aliphatic hydrocarbons to isomers of the raw material by reaction in the presence of a catalyst consisting essentially of aluminum chloride.

Isomerization of aliphatic hydrocarbons in the presence of aluminum chloride is known to those skilled in the art, but the processes heretofore proposed are so slow as to be commercially impractical. For example, treatment of normal butane and normal pentane at atmospheric temperatures for 5 to 6 days in the presence of aluminum chloride produces a yield of not more than about 40 per cent of branched-chain isomers of the treated hydrocarbons. Attempts to increase the efficiency of the process by raising the temperature are unsatisfactory because elevated temperatures result in excessive cracking with formation of polymers, coke and fixed gas. Serious corrosion of the apparatus by liberated hydrochloric acid also occurs at the higher temperatures.

We have now found that the speed and extent of isomerization of aliphatic hydrocarbons may be radically improved by dissolving the catalyst in a substantially inert solvent, the catalyst being present in a molar excess. The isomerization of n-butane and n-pentane to branched-chain isomers can be accomplished in 1 to 2 hours with a 65 per cent yield without substantial side reactions by employing aluminum chloride in this form. The use of solvents in connection with an aluminum chloride catalyst has been heretofore proposed for certain easily-induced reactions in the nature of the classical Friedel-Crafts synthesis. These previous catalytic solutions have been dilute, on the order of nitrobenzene solutions containing 20 to 30 per cent aluminum chloride dissolved. The sole purpose in such cases has been to modify vigorous reactions by dilution of the catalyst, and it is found that these solutions are practically inert in isomerization reactions.

As opposed to the above-noted concept of diluting aluminum chloride to reduce its effect, we find that solutions of that catalyst which contain a predominant amount of aluminum chloride possess greatly enhanced power to isomerize hydrocarbons. As will appear hereinafter, the increased effect seems to be associated with, and is probably due to, increased area of contact between hydrocarbons and catalyst with recurring presentation of fresh catalytic surfaces at the area of contact.

The solvents suitable for the purposes of this invention are liquids which will dissolve at least an equimolecular proportion of aluminum chloride and which are substantially inert, i. e., enter into no appreciable reaction with the catalyst or hydrocarbons in the reaction mixture, although some of them appear to have power to activate the catalyst. A good test for determining the suitability of a solvent is addition of water to a rich solution of aluminum chloride in the solvent in question. If vigorous reaction results, the solvent is generally suited to the present purposes.

A study of the operative solvents leads to the generalization that the solvent molecule usually includes an oxygen atom, although this does not appear to be essential so long as the desired properties are possessed by the solvent. In view of the fact that the solvent itself is inert, this structural test must be regarded as merely a reasonably safe guide for selection of solvents having adequate solvent power and not as a prerequisite for operability. In other words, those skilled in the art are advised to select solvents having oxygen atoms in the molecule as having greater solvent powers. It should be remembered, of course, that the solvent must be substantially inert. This limitation excludes those compounds, such as water, or excessive amounts of alcohols, glycols and the like.

Among the solvents found suited to the present purpose are nitrobenzene, the nitrotoluenes, the nitrochlorbenzenes, benzophenone, benzoyl chloride and sulphur dioxide. Certain general classes are suitable. Thus, ethers as typified by diethyl ether and diisopropyl ether; ketones such as acetone and methyl ethyl ketone; and the esters such as ethyl acetate and isopropyl acetate are eminently satisfactory solvents. A number of these compounds form equimolecular complexes with aluminum chloride, melting at elevated temperatures. However, with excess aluminum chloride the solvents form eutectic mixtures melting at much lower temperatures. Among the solvents unsuitable for the purposes of the invention because of their low solvent power for the catalyst are carbon disulfide, hydrocarbons, halogenated hydrocarbons, and inorganic chlorides such as hydrogen chloride, phosphorus chloride, stannic chloride, and titanium tetrachloride.

It is, of course, essential that the temperature at which the process is conducted be sufficiently high to maintain the mixture of catalyst and solvent at least partly in the liquid state. A further precaution may be observed with distinct advantage. There appears to be definite relationship between the efficiency of the reaction and the thoroughness of the mixing of the catalyst and the hydrocarbon. It is therefore highly advisable to conduct the reaction in a vessel provided with an agitating device which extends well into the lower liquid phase composed primarily of catalyst and solvent.

Example 1

A 1-liter autoclave was charged with 63 grams nitrobenzene, 500 grams n-pentane and 103 grams anhydrous aluminum chloride, closed, and heated with agitation at 70° C. for 1 hour and 50 minutes. The pressure rose gradually from 38 pounds to 68 pounds gauge in about 1 hour and then remained approximately constant, presumably because of attainment of substantial equilibrium between n-pentane and isopentane (with a little isobutane).

The autoclave was cooled to room temperature; the gas, isobutane with isopentane and a trace of hydrogen chloride, was released and condensed in a dry-ice bath. The autoclave was further cooled, opened, and the clear, colorless hydrocarbon product was poured out and distilled. The whole product had approximately the following composition:

| | Grams |
|---|---|
| Isobutane | 21 |
| Isopentane | 335 |
| n-Pentane | 90 |
| Higher boiling | 38 |

There was a loss of 16 grams, partly from handling.

Example 2

The above experiment was repeated, using 81 grams benzophenone instead of nitrobenzene. The composition of the product was substantially the same as before. In this case, after pouring out the hydrocarbon product, a new charge of n-pentane was introduced upon the same catalyst and the heating repeated. A higher temperature, 99° C., was used this time to accelerate the reaction because the catalyst seemed to have lost some of its activity by exposure to moist air during opening. Again the product had substantially the same composition.

Example 3

A similar experiment at 70° C. was made using 40 ml. or 31.5 grams acetone instead of nitrobenzene as a solvent. A slightly lower yield of about 50 per cent isopentane resulted.

Example 4

A similar experiment using 50 ml. or 36 grams ethyl ether, also at 70° C., gave almost 80 per cent yield of isobutane, showing that cracking was extensive and that ether activated the catalyst much more than the previously-tried solvents.

Example 5

Example 4 was repeated at 40° C. This temperature was sufficient to cause 80 per cent reaction, about half the product being isobutane and half isopentane.

Examples 6 and 7

In order to show the striking effect of the amount of solvent, two experiments were made exactly like Example 5 except that in 6 no ether was used and in 7 twice as much, 100 ml. or 72 grams, ether was used. The products in both cases were substantially pure n-pentane, less than 1 per cent having reacted.

Example 8

A similar experiment was made using 65 ml. or 57 grams isopropyl acetate as a solvent. A 30 per cent yield of isopentane was obtained in 1.5 hours at 40° C.

Example 9

A similar experiment with 78 ml. or 57 grams isopropyl ether as a solvent gave about 40 per cent conversion to isopentane.

Example 10

Twenty-three grams of sulfur dioxide as a solvent in a further experiment at 40° C. gave about 60 per cent of n-pentane converted to isopentane in 3 hours.

Example 11

An experiment using 54 m. or 49 grams ethyl acetate gave a yield of about 94 per cent isoparaffins, principally isobutane, with smaller amounts of isopentane and same branched-chain hexanes.

Examples 12 to 17

Six experiments were made similar to Example 11 except that in each case the product was decanted from the liquid catalyst and replaced with fresh n-pentane, thus employing the same catalyst for all six experiments. In Examples 12 and 13 the temperature was only 28° C. in order to limit the reaction chiefly to isomerization. Examples 14 and 15 were operated at 40° C.; Example 16 at 45° C.; and Example 17 at 50° C., the higher temperatures compensating for a slight loss in activity of the catalyst. This may have been due to absorption of moisture from the air during exposure while emptying and refilling the autoclave, or to a slight accumulation of polymerized by-product, or to some other cause, or combination of causes. In any case, the extent of the reaction in the last case, 17, was at least as much as in the first, about 50 per cent. The second one, 13, was the only one which fell appreciably below that figure.

After experiment 17, the viscous catalyst still reacted vigorously with water, evolving heat which evaporated off the ethyl acetate, leaving about 4 ml. oil. This was less than 0.3 per cent of the total hydrocarbon treated in the form of highly polymerized product. This series of six experiments illustrates the fundamentally catalytic character of the aluminum chloride solutions, since they can be used substantially indefinitely if properly protected from contamination with water. On the other hand, the amount of catalyst used in one experiment cannot be diminished without limit because inadequate contact of the two liquid phases might result.

Example 18

To illustrate this, an experiment was made similar to Example 5 but with 25 ml. or 18 grams of ethyl ether and 50 grams aluminum chloride (about half as much catalyst as in that experiment). The yield also was cut in half, probably because only the lower portion of the pentane came into adequate contact with the catalyst.

Example 19

The previous examples were made with n-pentane; n-butane is much less reactive and so requires a longer time or a higher temperature. An experiment was made with 50 ml. or 36 grams ethyl ether and 103 grams aluminum chloride with 800 ml. or 480 grams of n-butane. After 17 hours at 30° C. the hydrocarbon layer contained 30 per cent of isobutane.

Example 20

A charge identical with that of Example 19 was heated at 70° C. for 7 hours to give a conversion of 50 per cent to isobutane.

Example 21

A mixture of 230 ml. or 140 grams n-butane, 10 ml. of ethyl ether, and 28 grams aluminum chloride was heated with stirring in a smaller autoclave of about 290 ml. capacity to 98° C. for 1.5 hours. The product contained 59 per cent of isobutane, 40 per cent of n-butane and 1 per cent of propane. Nothing boiling above 0° C. could be detected in a Podbielniak analysis, indicating the absence of pentane or any polymerization or alkylation product, and also the absence of ether from the hydrocarbon layer. This illustrates the fact that the solvent, in this case ethyl ether, is so closely affiliated with the aluminum chloride that the catalyst can be considered as a unit.

Data collected, including the experiments reported above as Examples 19, 20, and 21, indicate that the rate of reaction in the present catalytic process doubles for a rise in temperature of approximately 7° C. as contrasted with the more usual 10° C. for organic reactions.

Example 22

Without removing the catalyst from the autoclave in Example 21, the latter was refilled with a like charge of n-butane and heated again to 98° C. for two hours. This time the product contained 63 per cent. of isobutane, very close to the amount estimated (66 per cent.) for equilibrium in the liquid phase at this temperature. The higher conversion may have been due to the slightly longer time. In any case, it shows that the catalyst has not suffered appreciable deterioration in activity.

Example 23

The autoclave was charged with 241 ml. n-hexane, 28 g. aluminum chloride and 10 ml. ethyl ether; and stirred for three hours at 40–50° C. No pressure resulted and the product consisted of about 90% of isomeric hexanes, 2% lower paraffines (probably isopentane) and 8% higher paraffins. The hexanes were analyzed by fractional distillation with the following results:

| Isomer | B. pt. | Percentage |
|---|---|---|
| 2,2 dimethyl butane | 49.73 | 12 |
| 2,3 dimethyl butane | 58.00 | 41 |
| 2 methyl pentane | 60.27 | 20 |
| 3 methyl pentane | 63.23 | 23 |
| n-Hexane | 68.74 | 4 |

In general, the relative amounts of solvent and aluminum chloride may be varied considerably within the scope of the invention, provided that the aluminum chloride is present in at least approximately equimolecular amounts with respect to the solvent and that the mixture contains sufficient solvent to render it fluid and homogeneous at the reaction temperature, i. e., the mixture must have a melting point below the temperature of the reaction. In most cases it is preferred that the mixture have a melting point not substantially above about 100° C. While an equimolecular mixture will normally show a substantial effect, it is better that even larger proportions of aluminum chloride be used, preferably at least about 3 mols aluminum chloride to 2 mols of solvent; while with certain solvents, of which ethyl acetate is an example, it is desirable that the mol ratio be in the neighborhood of 3 to 1.

Care should be exercised in the use of certain solvents, in particular those containing nitro groups, in view of their tendency to decompose in the presence of aluminum chloride. For example, it has been found that nitrobenzene, although not commonly considered explosive, may become so at temperatures upwards of 90° C.

We claim:

1. The process of converting paraffin hydrocarbons having at least four carbon atoms to isomers thereof which comprises contacting said hydrocarbons with a liquid catalyst consisting of anhydrous aluminum chloride substantially completely dissolved in not more than an equimolecular proportion of a substantially inert solvent therefor at a temperature above the melting point of the solution.

2. The process of converting paraffin hydrocarbons having at least four carbon atoms to isomers thereof which comprises contacting said hydrocarbons with a liquid catalyst consisting of anhydrous aluminum chloride substantially completely dissolved in a substantially inert solvent therefor, the mol ratio of catalyst to solvent being at least 3 to 2, at a temperature above the melting point of the solution.

3. The process of converting paraffin hydrocarbons having at least four carbon atoms to isomers thereof which comprises contacting said hydrocarbons with a liquid catalyst consisting of anhydrous aluminum chloride substantially completely dissolved in not more than an equimolecular proportion of a substantially inert solvent therefor at a temperature above the melting point of the solution, said solution having a melting point not substantially in excess of 100° C.

4. The process of converting paraffin hydrocarbons having at least four carbon atoms to isomers thereof which comprises contacting said hydrocarbons with a liquid catalyst consisting of anhydrous aluminum chloride substantially completely dissolved in a substantially inert solvent therefor, the mol ratio of catalyst to solvent being at least 3 to 2, at a temperature above the melting point of the solution, said solution having a melting point not substantially in excess of 100° C.

5. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in not more than an equimolecular proportion of a substantially inert solvent therefor at a temperature above the melting point of the solution.

6. The process of converting normal pentane to branched-chain hydrocarbons which comprises contacting said pentane with a liquid catalyst consisting of anhydrous aluminum chloride substantially completely dissolved in not more than an equimolecular proportion of a substantially inert solvent therefor at a temperature above the melting point of the solution.

7. The process of converting normal butane to branched-chain hydrocarbons which comprises contacting said butane with a liquid catalyst consisting of anhydrous aluminum chloride substantially completely dissolved in not more than an equimolecular proportion of a substantially inert solvent therefor at a temperature above the melting point of the solution.

8. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in not more than an equimolecular proportion of liquid sulphur dioxide at a temperature above the melting point of the solution.

9. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in not more than an equimolecular proportion of nitrobenezene at a temperature above the melting point of the solution.

10. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in not more than an equimolecular proportion of ethyl ether at a temperature above the melting point of the solution.

11. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in liquid sulphur dioxide, the mol ratio of catalyst to solvent being at least 3 to 2, at a temperature above the melting point of the solution.

12. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in nitrobenzene, the mol ratio of catalyst to solvent being at least 3 to 2, at a temperature above the melting point of the solution.

13. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in ethyl ether, the mol ratio of catalyst to solvent being at least 3 to 2, at a temperature above the melting point of the solution.

14. The process of converting normal pentane to branched-chain hydrocarbons which comprises contacting said pentane with a liquid catalyst consisting of anhydrous aluminum chloride substantially completely dissolved in not more than an equimolecular proportion of liquid sulphur dioxide at a temperature above the melting point of the solution.

15. The process of converting normal pentane to branched-chain hydrocarbons which comprises contacting said pentane with a liquid catalyst consisting of anhydrous aluminum chloride substantially completely dissolved in not more than an equimolecular proportion of nitrobenzene at a temperature above the melting point of the solution.

16. The process of converting paraffin hydrocarbons having at least four carbon atoms to isomers thereof which comprises contacting said hydrocarbon with a liquid catalyst consisting of anhydrous aluminum chloride substantially completely dissolved in not more than an equimolecular proportion of a substantially inert, oxygen-containing solvent therefor at a temperature above the melting point of the solution.

17. The process of converting paraffin hydrocarbons having at least four carbon atoms to isomers thereof which comprises contacting said hydrocarbons with a liquid catalyst consisting of anhydrous aluminum chloride substantially completely dissolved in a substantially inert, oxygen-containing solvent therefor, the mol ratio of catalyst to solvent being at least 3 to 2, at a temperature above the melting point of the solution.

ALFRED W. FRANCIS.
WILLIAM H. JAMES.

CERTIFICATE OF CORRECTION.

Patent No. 2,389,250.    November 20, 1945.

ALFRED W. FRANCIS, ET AL.

It is hereby certified that error appears in the printed specification of the above numbered patent requiring correction as follows: Page 1, second column, line 50, for "chloride" read --trichloride--; page 2, second column, line 24, for "same" read --some--; and that the said Letters Patent should be read with this correction therein that the same may conform to the record of the case in the Patent Office.

Signed and sealed this 9th day of April, A. D. 1946.

Leslie Frazer (Seal)    First Assistant Commissioner of Patents.

solvent therefor at a temperature above the melting point of the solution.

8. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in not more than an equimolecular proportion of liquid sulphur dioxide at a temperature above the melting point of the solution.

9. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in not more than an equimolecular proportion of nitrobenezene at a temperature above the melting point of the solution.

10. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in not more than an equimolecular proportion of ethyl ether at a temperature above the melting point of the solution.

11. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in liquid sulphur dioxide, the mol ratio of catalyst to solvent being at least 3 to 2, at a temperature above the melting point of the solution.

12. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in nitrobenzene, the mol ratio of catalyst to solvent being at least 3 to 2, at a temperature above the melting point of the solution.

13. The process of converting normal paraffin hydrocarbons having at least four carbon atoms to branched-chain hydrocarbons which comprises contacting said normal hydrocarbons with a liquid catalyst consisting of anhydrous aluminum chloride substantially completely dissolved in ethyl ether, the mol ratio of catalyst to solvent being at least 3 to 2, at a temperature above the melting point of the solution.

14. The process of converting normal pentane to branched-chain hydrocarbons which comprises contacting said pentane with a liquid catalyst consisting of anhydrous aluminum chloride substantially completely dissolved in not more than an equimolecular proportion of liquid sulphur dioxide at a temperature above the melting point of the solution.

15. The process of converting normal pentane to branched-chain hydrocarbons which comprises contacting said pentane with a liquid catalyst consisting of anhydrous aluminum chloride substantially completely dissolved in not more than an equimolecular proportion of nitrobenzene at a temperature above the melting point of the solution.

16. The process of converting paraffin hydrocarbons having at least four carbon atoms to isomers thereof which comprises contacting said hydrocarbon with a liquid catalyst consisting of anhydrous aluminum chloride substantially completely dissolved in not more than an equimolecular proportion of a substantially inert, oxygen-containing solvent therefor at a temperature above the melting point of the solution.

17. The process of converting paraffin hydrocarbons having at least four carbon atoms to isomers thereof which comprises contacting said hydrocarbons with a liquid catalyst consisting of anhydrous aluminum chloride substantially completely dissolved in a substantially inert, oxygen-containing solvent therefor, the mol ratio of catalyst to solvent being at least 3 to 2, at a temperature above the melting point of the solution.

ALFRED W. FRANCIS.
WILLIAM H. JAMES.

---

CERTIFICATE OF CORRECTION.

Patent No. 2,389,250.   November 20, 1945.

ALFRED W. FRANCIS, ET AL.

It is hereby certified that error appears in the printed specification of the above numbered patent requiring correction as follows: Page 1, second column, line 50, for "chloride" read --trichloride--; page 2, second column, line 24, for "same" read --some--; and that the said Letters Patent should be read with this correction therein that the same may conform to the record of the case in the Patent Office.

Signed and sealed this 9th day of April, A. D. 1946.

Leslie Frazer
(Seal)   First Assistant Commissioner of Patents.